(12) United States Patent
Payne et al.

(10) Patent No.: US 11,421,742 B2
(45) Date of Patent: Aug. 23, 2022

(54) TORQUE CONVERTER CONNECTION ON HYBRID POWERTRAIN

(71) Applicant: SCHAEFFLER TECHNOLOGIES AG & CO. KG, Herzogenaurach (DE)

(72) Inventors: Matthew Payne, Glenmont, OH (US); Christopher Shamie, Brighton, MI (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 365 days.

(21) Appl. No.: 16/717,050

(22) Filed: Dec. 17, 2019

(65) Prior Publication Data

US 2021/0180652 A1 Jun. 17, 2021

(51) Int. Cl.
*F16D 3/06* (2006.01)
*F02C 7/36* (2006.01)
*F16H 45/02* (2006.01)

(52) U.S. Cl.
CPC .............. *F16D 3/06* (2013.01); *F02C 7/36* (2013.01); *F16H 45/02* (2013.01)

(58) Field of Classification Search
CPC ...... F16D 3/06; F16D 1/101; F16D 2001/103; F02C 7/36; F16H 45/02; F16H 2045/0221; F16H 2045/0294
See application file for complete search history.

(56) References Cited

U.S. PATENT DOCUMENTS

| | | | |
|---|---|---|---|
| 7,296,666 B1 * | 11/2007 | Morin | F16H 45/02 192/3.28 |
| 2004/0050640 A1 * | 3/2004 | Schmid | F16H 45/02 192/3.29 |
| 2008/0072586 A1 * | 3/2008 | Hammond | B60K 6/485 60/330 |
| 2016/0252170 A1 * | 9/2016 | Lindemann | F04D 29/18 415/122.1 |
| 2019/0044410 A1 | 2/2019 | Vanni et al. | |

* cited by examiner

*Primary Examiner* — Jacob M Amick
*Assistant Examiner* — Charles J Brauch

(57) ABSTRACT

A torque converter is configured to connect with an electric machine via a connecting assembly. The torque converter includes a front cover facing the electric machine. The connecting assembly is non-rotatably fixed to the front cover to be coaxial with a rotor shaft of the electric machine. The connecting assembly defines axially extending teeth configured to engage the electric machine.

20 Claims, 2 Drawing Sheets

TORQUE CONVERTER CONNECTION ON HYBRID POWERTRAIN

TECHNICAL FIELD

The present disclosure relates to hybrid powertrains and more specifically to ways of connecting a torque converter to one or more actuators.

BACKGROUND

Vehicles may include hybrid powertrains to improve fuel economy. A hybrid powertrain includes multiple types of actuators to propel the vehicle. A typical hybrid powertrain includes an internal-combustion engine and at least one electric machine capable of acting as a motor, a generator, or both. The electric machine is powered by a traction battery, such as a lithium-ion battery pack that includes a plurality of individual cells.

SUMMARY

According to one embodiment, a hybrid powertrain includes an electric machine having a rotor shaft defining first axially extending teeth. A torque converter has a front cover facing the electric machine and a connecting assembly non-rotatably fixed to the front cover to be coaxial with the rotor shaft. The connecting assembly defines second axially extending teeth engaged with the first teeth to couple the rotor shaft to the front cover.

According to another embodiment, a torque converter includes a front cover, an impeller fixed to the front cover, and a turbine adjacent the impeller and configured to fluidly couple with the impeller. The turbine and the impeller are supported for rotation about an axial centerline of the torque converter. A drive disc has a plate portion attached to the front cover such that the drive disc rotates in unison with the cover about the centerline. The drive disc has a hub portion connected to a first inner circumferential surface of the plate portion. The hub portion has a second inner circumferential surface defining axially extending teeth configured to engage with a rotor shaft. A pilot of the torque converter is centered on the centerline and circumscribed by the second inner circumferential surface. The pilot has a circumferential pilot surface that is radial spaced from the second inner circumferential surface by a distance providing clearance for the rotor shaft to be connected to the hub portion.

According to yet another embodiment, a torque converter includes a front cover, an impeller fixed to the front cover, and a turbine adjacent the impeller and configured to fluidly couple with the impeller. The turbine and the impeller are supported for rotation about an axial centerline of the torque converter. An input shaft is non-removably fixed to the front cover to be centered on the centerline. The shaft has an outer circumferential surface having first connection features configured to engage with second connection features of a rotor shaft.

DETAILED DESCRIPTION

Figure 1:
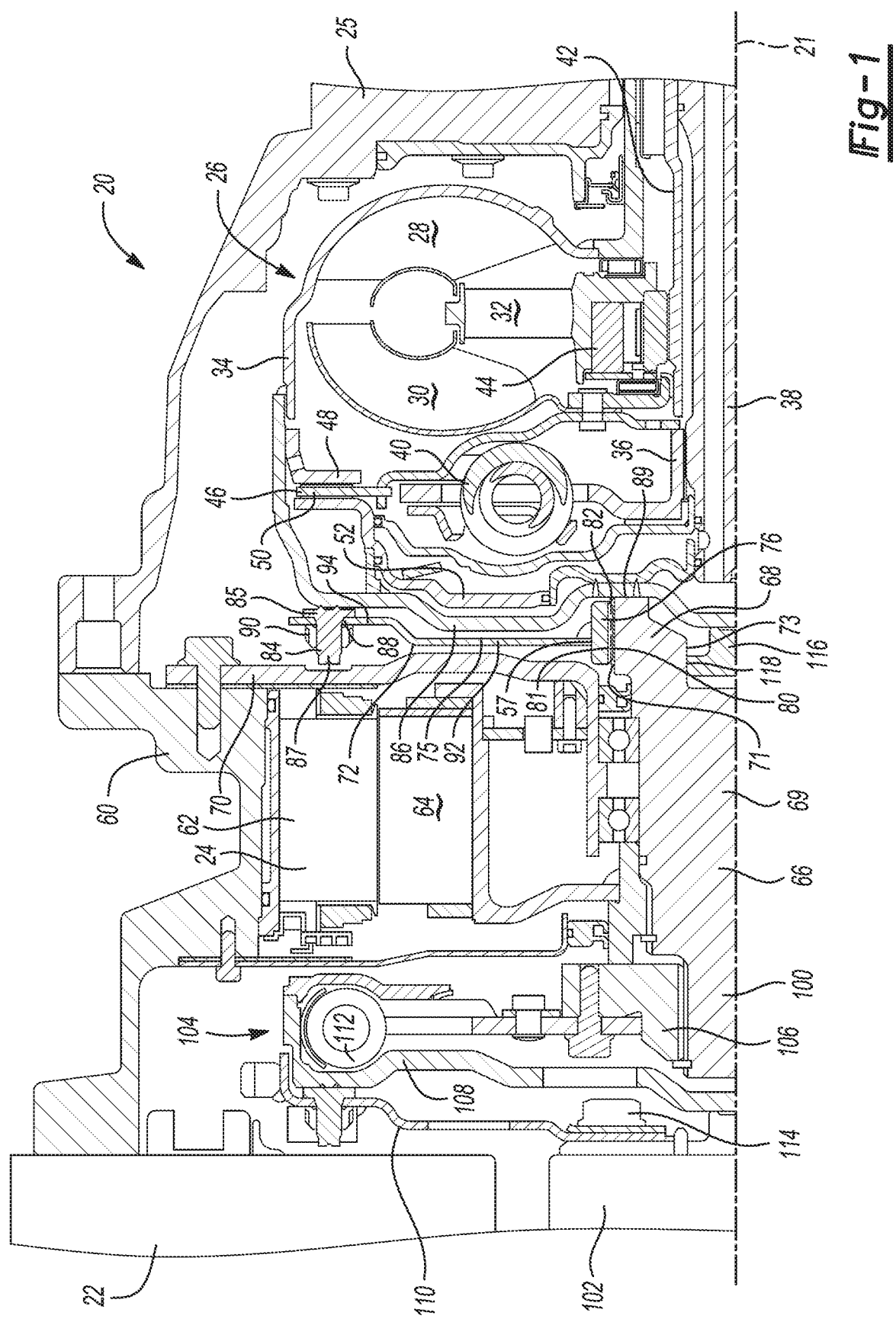
FIG. 1 is a side cross-sectional view of a hybrid powertrain.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Directional terms used herein are made with reference to the views and orientations shown in the exemplary figures. A central axis (also known as a centerline) is shown in the figures and described below. Terms such as "outer" and "inner" are relative to the central axis. For example, an "outer" surface means that the surfaces face away from the central axis, or is outboard of another "inner" surface. Terms such as "radial," "diameter," "circumference," etc. also are relative to the central axis. The terms "front," "rear," "upper" and "lower" designate directions in the drawings to which reference is made. The terms, connected, attached, etc., refer to directly or indirectly connected, attached, etc., unless otherwise indicated explicitly or by context.

Referring to FIG. 1, a hybrid powertrain 20 includes actuators, e.g., an engine 22 and an electric machine 24, for powering driven wheels (not shown) of a vehicle. The vehicle may be a road vehicle such as a car, sport-utility vehicle, crossover, or pickup truck. The actuators may be mated to a transmission 25, such as a discrete-ratio multi-step transmission (commonly referred to as an automatic transmission), by a torque converter 26. The transmission 25 may be a continuously-variable transmission or the like in other embodiments. The powertrain 20 includes a central axis or centerline 21. Many of the rotating components of the powertrain 20, including the engine crankshaft, the electric machine, and the torque converter, are supported for rotation about the central axis 21.

The torque converter 26 is a type of fluid coupling that transfers torque from an input member to an output member hydrodynamically. In one embodiment, the torque converter 26 includes an impeller 28, a turbine 30 adjacent to the impeller, and a stator 32 disposed between the impeller 28 and the turbine 30. The impeller 28 is fixed to a cover 34 of the torque converter 26. The cover 34 is driveably connected to the actuators to receive power as described in detail below. The turbine 30 is connected to a hub 36 that is connected to a turbine shaft 38 such as by a spline connection. The turbine shaft 38 is either the transmission input shaft or is coupled to the transmission input shaft to supply power to the transmission 25. A damper 40 may be interposed between the turbine 30 and the hub 36.

The stator 32 may be coupled to a stator shaft 42 by a one-way clutch 44. The stator shaft 42 is fixed to a front support of the transmission 25 and is stationary relative to the torque converter 26. When the turbine shaft 38 is stationary or rotating slowly compared to cover 34, the one-way clutch 44 holds the stator 32 stationary. Rotation of the impeller 28 forces fluid to move between the impeller 28, the turbine 30, and the stator 32. The fluid exerts a hydrodynamic torque on the turbine 30. The stator 32 provides a reaction force causing the torque on the turbine 30 to be greater than the torque on the impeller 28. When the speed of the turbine 30 approaches that of the impeller 28, fluid tends to flow around the centerline of the torque converter 26 causing the one-way clutch 44 to overrun.

The torque converter 26 may also include a bypass clutch 46 engageable to ground the hub 36 to the front cover 34 to bypass the hydrodynamic torque path through the impeller 28 and the turbine 30. According to one or more embodiments, the bypass clutch 46 may include a clutch plate 48 fixed to the cover 34, a friction disc 50, and a piston 52. The friction disc 50 is connected to the hub 36 via the damper 40. The friction disc 50 is configured to frictionally engage with the clutch plate 48 to lock the hub 36 to the cover 34. The piston 52 is hydraulically actuated by flowing fluid (typically transmission fluid) to a piston chamber to stroke the piston. A compensation chamber and/or a spring may be used to return the piston 52 and disengage the bypass clutch 46. The bypass clutch 46 may include a disengaged state, and a locked state (fully engaged), and a partially engaged state (slipping). When the bypass clutch 46 is disengaged, power received at the cover 34 is transferred through the hydrodynamic power flow path from the impeller 28 to the turbine 30. When the bypass clutch 46 is locked, power received at the cover 34 is mechanically transferred through the bypass clutch 46. In a slipping state, power received at the cover 34 flows through both the mechanical and the hydrodynamic power flow paths.

The electric machine 24 may act as a motor to power the driven wheels or as a generator to charge a traction battery. The electric machine 24 may include a housing 60, a stator 62, and a rotor 64. The rotor 64 is supported on a rotor shaft 66 and non-rotatably connected thereto. The rotor shaft 66 is connectable to the cover 34 of the torque converter 26. The rotor shaft 66 includes a rear end portion 68 that projects out of a back wall 70 of the housing 60. The rotor shaft 66 may have a varying diameter. For example, the end portion 68 may have a larger diameter than an intermediate portion 69. The end portion 68 includes an outer circumferential surface 71 and defines a pilot bore 73 that is centered on the centerline 21 of the rotor shaft 66.

The electric machine 24 is driveably connected to the front cover 34. Two components are driveably connected if they are connected by a power flow path that constrains their rotational speeds to be directly proportional. The torque converter 26 includes a connecting assembly used to driveably connect the rotor shaft 66 to the cover 34. The connecting assembly may be fixed to the cover 34 and connect to the rotor shaft 66 via a toothed connection such as a spline connection in which the rotor shaft 66 defines first axially extending teeth and the connecting assembly defines second extending teeth meshing with the first. For example, the shaft end portion 68 may be connected to the torque converter 26 by a drive disc 72, which is one example embodiment of a connecting assembly. The drive disc 72 may be co-axial with the centerline 21. The drive disc 72 may include a plate portion 75 and a hub portion 76. The plate portion 75 may be a circular disc having a hollow center. Formed around the perimeter of the hollow center is an inner circumferential surface 57. The inner circumferential surface 57 is joined to the hub portion 76 such that the plate portion 75 and the hub portion 76 are fixed. For example, the hub portion 76 may be welded to the plate portion 75. The hub portion 76 includes connection features configured to connect the other connection features of the rotor shaft 66 to driveably connect the electric machine 24 and the torque converter 26. The hub portion 76 may be a circular sleeve that defines internal teeth 80, e.g., internal spline teeth, formed on an inner circumferential surface 81 that mate with external teeth 82, e.g., external spline teeth, formed on the surface 71 of the end portion 68.

The cover 34 of the torque converter 26 may be connected to the drive disc 72 by fasteners. The torque-converter cover 34 may include a plurality of studs 84 attached to a front face 86 of the cover 34. The studs 84 may be arranged around the face 86 in a circle or may be radially offset from each other. Each stud 84 may include a head 85 that is welded to the front face 86 and a shank 87 that extends axially forward towards the electric-machine housing 60. The plate portion 75 defines a plurality of holes 88 that are also circumferentially arranged to align with the studs 84. The plate portion 75 is connected to the cover 34 by inserting the studs 84 through the holes 88 and installing retainers, such as nuts 90, on the studs 84. The plate portion 75 may be a stamping such as a stamped steel plate. The plate portion 75 may be formed to conform in shape with the front face 86 of the cover 34. In the illustrated embodiment, the plate portion 75 includes a first radially extending wall 92 and a second radially extending wall 94 that are axially offset from each other.

A front end 100 of the rotor shaft 66 is connected to the engine 22. A crankshaft 102 of the engine 22 may be connected to the rotor shaft 66 by a damper 104. The damper 104 may include a hub 106 defining internal splines that connect with external splines defined on the front end 100 of the rotor shaft 66. A cover 108 of the damper 104 is connected to a flex plate 110. Damper springs 112 connect between the cover 108 to the hub 106. The flex plate 110 is connected to the crankshaft 102 by fasteners 114.

The above-described torque-converter connection allows for blind assembly of the torque converter 26 to the electric machine 24 as the spline teeth 80 and 82 can be connected without requiring worker access. The torque converter 26 may include a pilot 116 to facilitate centering. The pilot 116 is received within the pilot bore 73 of the rotor shaft 66 to center the torque converter 26. The pilot 116 is attached to the front cover 34 such that it is centered on the centerline 21. The pilot 116 may be attached to the front cover 34 by welding or other attachment method. The pilot 116 may include a cylindrical body with variable diameter along its length. The pilot 116 may include a circumferential pilot surface 118 near a distal end of the pilot 116. The pilot surface 118 is configured to engage with a sidewall of the pilot bore 73 of the rotor shaft 66 to align the torque converter 26 (and the attached transmission) with the housing 60 during assembly. The pilot 116 is circumscribed by the hub portion 76 of the drive disc 72. The diameter of the pilot surface 118 is smaller than the diameter of the inner circumferential surface 81 of the hub portion 76 so that there is a radial gap therebetween. The radial gap allows the rotor shaft 66 to be inserted. The pilot 116 and the hub portion 76 are sized so that the radial gap is substantially equal to a radial distance between the outer circumferential surface 71 and the sidewall of the pilot bore 73. Substantially equal refers to clearance being present to facility assembly. For example, the clearance may be between 0.015 to 0.04 millimeters. In an alternative embodiment, the pilot 116 may be a portion of the cover 34 rather than a separate component that is attached to the cover. For example, the cover 34 may be stamped to have an extended nose with a circumferential pilot surface formed near the distal end of the nose. An end face 89 of the rotor shaft 66 engages with the front face 86 of the cover 34 to prevent axial movement of the torque converter 26.

Figure 2:
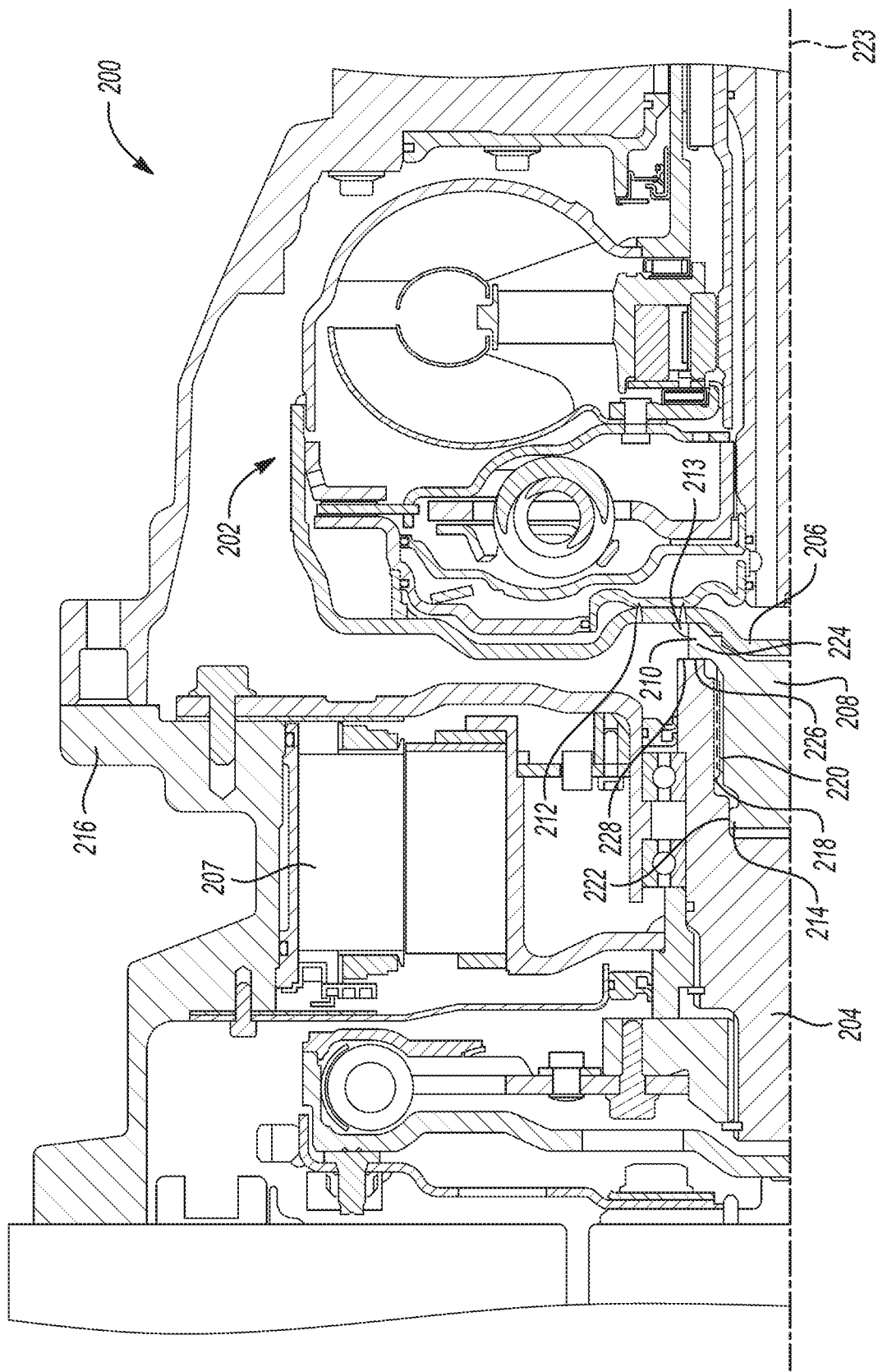
FIG. 2 is a side cross-sectional view of another hybrid powertrain.

FIG. 2 illustrates a powertrain 200 according to an alternative embodiment. For brevity, common components with the embodiment shown in FIG. 1 are not being discussed again. Here, a torque-converter shaft 208 (also referred to an input shaft or simply shaft) serves as the connecting assembly. The shaft 208 is non-removably fixed to a front cover 206 of a torque converter 202. "Non-removably fixed" refers in one or more embodiments to connections that are designed to not be disconnected. Examples include welding, bonding, riveting, and any other connection that requires destruction to achieve disconnection. The shaft 208 projects forward from the front cover 206 towards the electric machine 207. The shaft 208 may include a base 210 attached to an outer surface 212 of the front cover 206 such as by welding 213. The shaft 208 connects with a rotor shaft 204 of the electric machine 207 to driveably connect the torque converter 202 to the actuators. The torque-converter shaft 208 may connect to the rotor shaft 204 by meshing axially extending teeth, e.g., internal and external spline connections. The connection between the shafts 204, 208 is a blind connection allowing the torque converter 202 to be installed to the electric-machine housing 216 without requiring backside access. The rotor shaft 204 and the torque-converter shaft 208 may include aligning and stopping features to facilitate assembly.

In the illustrated embodiment, the shafts 204 and 208 are connected via mating splines with the rotor shaft 204 defining an internal spline 218 and the torque-converter shaft 208 defining an external spline 220. This may be flipped in other embodiments. The rotor shaft 204 may define a pilot bore 222 having a diameter that is smaller than the internal spline 218. The pilot bore 222 is centered on the centerline 223 of the rotor shaft 204 (which is also the centerline of the powertrain) and receives a pilot 214 formed on the distal end of the shaft 208 to center the shafts 204, 208 to each other. The pilot 214 may be a circumferential surface formed on the distal end of the shaft 208. The pilot 214 may have a diameter that substantially matches the pilot bore 222 (some clearance is provided to ease assembly) and is smaller than a diameter of the external spline 220. The torque-converter shaft 208 may define a stopper 224 formed on or near the base 210. The stopper 224 may be a larger diameter portion of the shaft 208 that includes a radial face 226. The radial face 226 engages with a distal end 228 of the shaft 204. The stopper 224 and the distal end 228 cooperate to provide thrust surfaces that resist axial movement of the torque converter 202 and facilitate proper assembly.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST powertrain 20
central axis 21
engine 22
electric machine 24
transmission 25
torque converter 26
impeller 28
turbine 30
stator 32
front cover 34
hub 36
turbine shaft 38
damper 40
stator shaft 42
one-way clutch 44
bypass clutch 46
clutch plate 48
friction disc 50
piston 52
inner circumferential surface 57
housing 60
stator 62
rotor 64
rotor shaft 66
rear end portion 68
intermediate portion 69
back wall 70
outer circumferential surface 71
drive disc 72
pilot bore 73
plate portion 75
hub portion 76
internal teeth 80
inner circumferential surface 81
external teeth 82
studs 84
head 85
front face 86
shank 87
end face 89
holes 88
nuts 90
first radially extending wall 92
second radially extending wall 94
front end 100
crankshaft 102
damper 104
hub 106
cover 108
flex plate 110
damper springs 112
fasteners 114 pilot 116
pilot surface 118
powertrain 200
torque converter 202
rotor shaft 204
front cover 206
electric machine 207
shaft 208
base 210
outer surface 212
welding 213
pilot 214
electric-machine housing 216
internal spline 218
external spline 220
pilot bore 222
centerline 223
stopper 224
radial face 226
distal end 228

What is claimed is:

1. A torque converter comprising:
a front cover;
an impeller fixed to the front cover;
a turbine adjacent the impeller and configured to fluidly couple with the impeller, wherein the turbine and the impeller are supported for rotation about an axial centerline of the torque converter;
a drive disc including a plate portion attached to the front cover such that the drive disc rotates in unison with the cover about the centerline and including a hub portion connected to a first inner circumferential surface of the plate portion, wherein the hub portion has a second inner circumferential surface defining axially extending teeth configured to engage with a rotor shaft of an electric machine, wherein the electric machine includes a rotor and housing having a back wall arranged axially between the rotor and the drive disc; and
a pilot centered on the centerline and circumscribed by the second inner circumferential surface, the pilot including a circumferential pilot surface that is radially spaced from the second inner circumferential surface by a distance that provides clearance for the rotor shaft to be connected to the hub portion.

2. The torque converter of claim 1, wherein the pilot is attached to the front cover.

3. The torque converter of claim 2, wherein the pilot is attached by a weld to the front cover.

4. The torque converter of claim 1, wherein the front cover includes a stud extending axially therefrom, and the plate portion defines a hole that receives the stud therein to connect the drive disc to the front cover.

5. The torque converter of claim 4, wherein the stud is a plurality of studs circumferentially arranged on the front cover, and the holes are a plurality of holes circumferentially arranged on the plate portion to align with the studs.

6. The torque converter of claim 4, wherein the stud includes a head portion that is connected to a front face of the front cover.

7. The torque converter of claim 1, wherein the axially extending teeth are an internal spline.

8. The torque converter of claim 1, wherein the plate portion includes a first radially extending wall and a second radially extending wall that is axially offset from the first wall.

9. The torque converter of claim 1, wherein the hub portion is a cylindrical sleeve.

10. A hybrid powertrain comprising:
an electric machine including a rotor shaft defining first axially extending teeth; and
a torque converter including a front cover facing the electric machine and a connecting assembly non-rotatably fixed to the front cover to be coaxial with the rotor shaft, the connecting assembly defining second axially extending teeth engaged with the first teeth to couple the rotor shaft to the front cover, wherein the first axially extending teeth are defined on an inner circumferential surface of the rotor shaft, and wherein the connecting assembly includes a shaft having an outer circumferential surface that defines the second axially extending teeth.

11. The hybrid powertrain of claim 10, wherein the rotor shaft further defines a pilot bore, and the torque converter further includes a pilot having a circumferential pilot surface engaged with the pilot bore.

12. The hybrid powertrain of claim 10, wherein the rotor shaft further defines a pilot bore, and the torque converter further includes a pilot coaxial with the rotor shaft and having a circumferential pilot surface engaged with the pilot bore.

13. A torque converter comprising:
a front cover;
an impeller fixed to the front cover;
a turbine adjacent the impeller and configured to fluidly couple with the impeller, wherein the turbine and the impeller are supported for rotation about an axial centerline of the torque converter; and
an input shaft non-removably fixed to the front cover to be centered on the centerline, the shaft including an outer circumferential surface having first connection features configured to engage with second connection features of a rotor shaft.

14. The torque converter of claim 13, wherein the first connection features are external teeth defined by the outer circumferential surface.

15. The torque converter of claim 14, wherein the external teeth form an external spline connection.

16. The torque converter of claim 13, wherein the input shaft includes a circumferential pilot surface, and wherein the first connection features are disposed between the circumferential pilot surface and the front cover.

17. The torque converter of claim 16, wherein a diameter of the circumferential pilot surface is smaller than a diameter of the outer circumferential surface.

18. The torque converter of claim 17, wherein first connection features are an external spline, and the input shaft is welded to the front cover.

19. The torque converter of claim 1, wherein the rotor shaft includes a rear end portion projecting out of the back wall of the housing and the hub portion of the drive disc engages with the rear end portion of the rotor shaft.

20. The torque converter of claim 19, wherein the rotor is mounted on a rotor carrier and supported on a front end portion of the rotor shaft via the rotor carrier.

* * * * *